Aug. 4, 1953  D. W. KELLER ET AL  2,647,692
MIXING VALVE
Filed Sept. 27, 1951
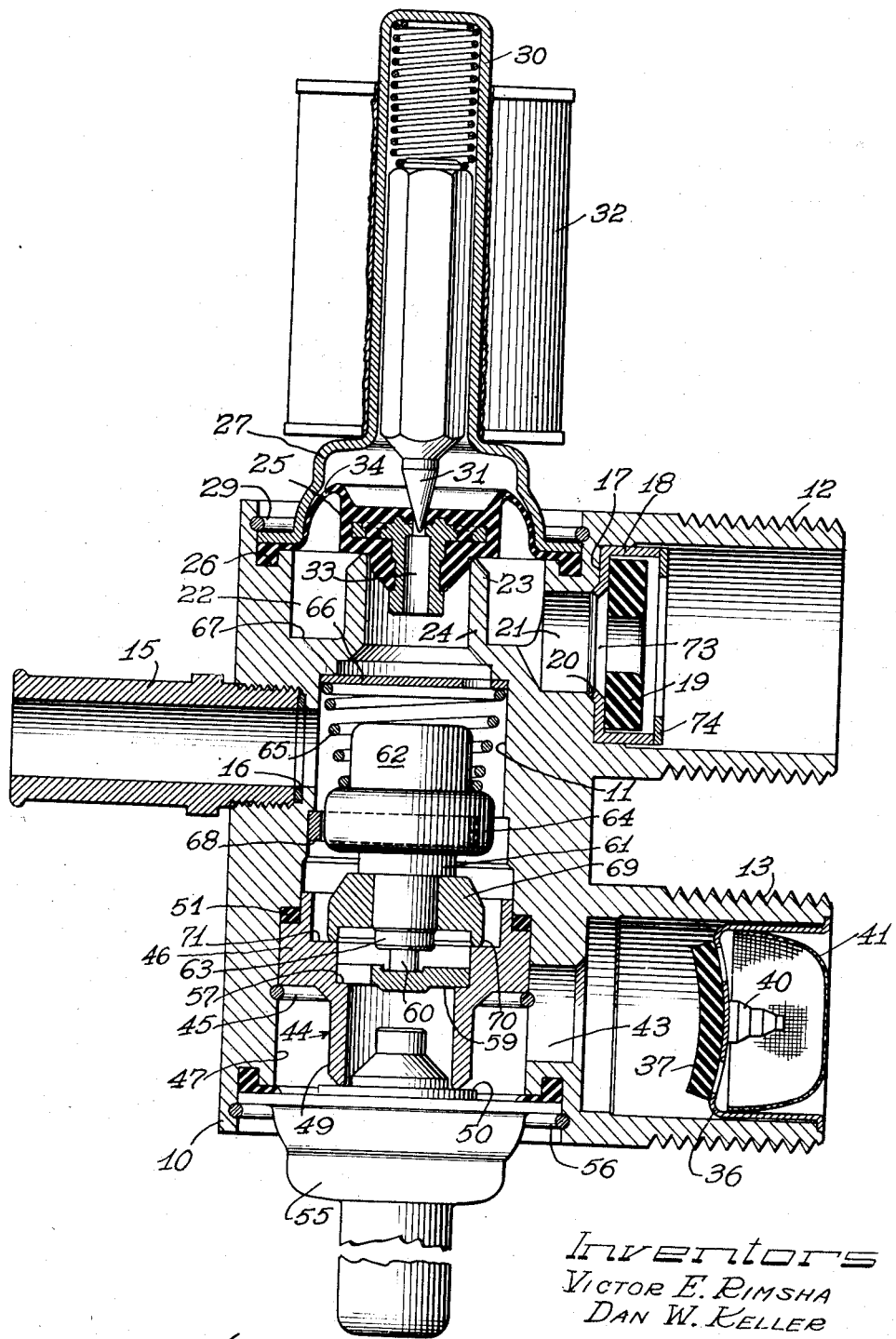
Inventors
VICTOR E. RIMSHA
DAN W. KELLER
by Hill, Sherman, Meroni, Gross & Simpson Attys.

Patented Aug. 4, 1953

2,647,692

UNITED STATES PATENT OFFICE 2,647,692

MIXING VALVE

Dan W. Keller and Victor E. Rimsha, Chicago, Ill., assignors to The Dole Valve Company, Chicago, Ill., a corporation of Illinois Application September 27, 1951, Serial No. 248,492

5 Claims. (Cl. 236—12)

This invention relates to improvements in thermostatically controlled fluid mixing valves for mixing hot and cold water and delivering hot water or a tempered water at a predetermined intermediate temperature.

A principal object of our invention is to provide a new and improved fluid mixing valve arranged with a view toward utmost simplicity in manufacture and operation.

Another object of our invention is to provide a fluid mixing valve having a central mixing chamber wherein the hot water enters the mixing chamber at a uniform rate of flow regardless of pressure variations and the flow of the cold water into the mixing chamber, for mixture with the hot water is controlled by a thermostatically operated valve member.

Still another object of our invention is to provide a fluid mixing valve including a mixing chamber and flow control means for delivering a substantially constant rate of flow of hot water to the mixing chamber, and thermal-responsive element within the mixing chamber having a valve member operated thereby for controlling the admission of cold water into the mixing chamber.

In carrying out our invention we provide a mixing valve for hot and cold water including a hollow valve body having a central mixing chamber, hot and cold water passageways leading into said mixing chamber from opposite ends thereof, with shut-off valve means selectively operable to control the passage of fluid through said passageways, a thermal-responsive valve element floatingly mounted within said mixing chamber and controlling the passage of cold water into said mixing chamber, and flow control means controlling the passage of hot water to said hot water shut off valve means and supplying hot water to said valve means and said mixing chamber at a substantially uniform rate of flow, regardless of variations in pressure in the hot water line.

These and other objects of our invention will appear from time to time as the following specification proceeds and with reference to the accompanying drawing in which the figure is a substantially vertical sectional view taken through a valve constructed in accordance with our invention, with the solenoid coil controlling operation of the cold water valve removed.

In the embodiment of our invention illustrated in the drawing, the valve is shown as comprising a valve body 10 having a central mixing chamber 11 therein and being open at its opposite ends for the passage of hot and cold water into said mixing chamber. The valve body 10 may be extruded from a brass bar into the general valve body shape desired, and then drilled and machined as required, or may be cast or molded from brass or bronze, a thermal plastic material or any other suitable material.

As herein shown, hot and cold water inlets 12 and 13 respectively lead into said valve body through the wall thereof. A mixed water outlet 15, shown as being in the form of a fitting threaded within the wall of said valve body in communication with the mixing chamber 11, leads from said mixing chamber. Said outlet 15 is shown as being threaded within a transversely drilled portion of said valve body and as engaging a sealing washer 16 at its inner end, seated in an outwardly facing shouldered portion of the drilled portion of said body, within which the outlet 15 is threaded.

The hot water inlet 12 is shown as having a shoulder 17 adjacent the wall of the valve body, against which is seated a cage 18 for a flow control member 19. The shoulder 17 terminates into a generally conical inwardly extending seat 20 for the cage 18, which communicates with a passageway 21, leading into said valve body. The passageway 21 in turn communicates with an annular passageway 22 opening to one end of said valve body and extending around an integral sleeve or passage defining member 23. The passage defining member 23 likewise opens to the end of said valve body and the interior thereof forms a hot water passageway 24, communicating with one end of the mixing chamber 11.

The outer end of the sleeve 23 is herein shown as forming a seat for a pressure operated valve 25, herein shown as being a fluid operated diaphragm valve of a well known form, similar to that shown in application Serial No. 179,810 filed by Frank E. Obermaier on August 16, 1950, so only herein described in sufficient detail to make my present invention readily understandable.

The diaphragm valve 25 has sealing engagement with the open end of the valve body 10 at its periphery in an annular groove 26 formed in the valve body and encircling the passageway 22. A closure cap 27 abuts the outer side of the diaphragm valve 25 adjacent the outer margin thereof and maintains said diaphragm valve in sealing engagement with the annular groove 26 and also closes the end of the valve casing. A snap ring 29 is herein shown as holding said closure cap in sealing engagement with said diaphragm. The closure cap 27 is shown as having a central guide 30, for a valve member 31, shown as being the armature of a solenoid 32 and engaged with a central orifice 33 in the diaphragm valve 25, to close said opening and maintain the valve closed. A bleeder passageway 34 extends through the diaphragm valve 25, to allow water to pass from one side of the diaphragm to the other and equalize the pressure on both sides of said diaphragm, when the central orifice 33 leading therethrough is closed by the valve element 31. When this occurs, the valve will be closed by pressure on the top side of said diaphragm, since the surface area exposed to fluid pressure on the top of said diaphragm is greater than the surface area exposed to fluid pressure on the underside thereof. Upon energization of the solenoid 32, however, the valve element 31 will move out of engagement with the central orifice 33, relieving pressure from the top or outer side of said diaphragm, and allowing said valve to open by the pressure of fluid on the underside thereof. This will open the end of the passage defining member 23 for the passage of hot water therethrough from the hot water inlet 12 into the central mixing chamber 11.

The cold water inlet 13 has a cage 36 for a check valve 37 seated therein. As herein shown, the cage 36 is of a generally cup-like shape having a concave bottom facing the interior of said inlet. The valve 37 is in the form of a flexible wafer engaging the concave bottom of the cage 36 upon back pressure in said inlet, and is held thereto by outwardly extending nibs extending through the bottom of said cage. Said cage is apertured for the flow of water therethrough against the valve 37 as in the aforementioned application Serial No. 179,810 of Frank E. Obermaier. The cage 36 is likewise shown as having a strainer 41 of a generally hat-like shape, contained in the inlet side thereof.

The inlet 13 communicates with a passageway 43 of reduced diameter, leading through the wall of the valve body 10 into the hollow interior thereof, adjacent the end thereof opposite from the passageway 20.

A valve seating and passageway defining insert 44 is herein shown as being seated in the end of the valve body 10 opposite from the hot water shut off valve 25, and hereinafter referred to as the cold water end of said valve body. A snap ring 45 holds said insert within said valve body. The valve seating and passageway defining insert 44 is herein shown as having an enlarged diameter portion 46 fitting in an inner wall 47 of the valve body and as having a reduced diameter portion 49 of a generally annular sleeve like form spaced inwardly from the wall 47 and extending outwardly toward the cold water end of the valve body and forming a seat for a fluid pressure operated diaphragm valve 50 at its outer end. A sealing ring 51 is provided to seal said seating member with the wall 47, to prevent the leakage of fluid along the wall 47 past the member 44.

The diaphragm valve 50 is like the diaphragm valve 25 and is maintained in sealing engagement with the cold water end of the valve body 10 by an end cap and guide member 55 held in sealing engagement with said diaphragm valve by means of a snap ring 56. Operation of the diaphragm valve 50 is controlled by the armature of a solenoid (not shown) and operates to admit cold water to the passageway formed by the hollow interior of the sleeve 49 in the same manner the diaphragm valve 25 controls the admission of hot water into the mixing chamber 11, so not herein shown or described further.

The seating insert 44 has an interior shoulder 57 facing the mixing chamber 11, within which is seated a spider 59. The spider 59 is herein shown as forming an abutment for a plunger 60 of a temperature sensitive element 61, contained within the mixing chamber 11.

The temperature sensitive element 61 may be of the so-called power element type wherein a deformable medium (not shown) carried in a casing 62 for the element acts against a membrane or deformable member (not shown) to extend the piston 60 from a cylinder 63 of said temperature sensitive element.

The casing 62 is herein shown as being encircled by a ring 64 secured thereto and abutted by a spring 65. The spring 65 is seated at its end opposite the ring 64 on an apertured insert 66, abutting a shoulder 67 at the hot water end of the mixing chamber 11. The spring 65 therefore maintains the temperature sensitive element 61 in engagement with the spider 59 and mounts said temperature sensitive element to float within the mixing chamber 11 against said spring. A cold water baffle 68 extends partially around the mixing chamber in the vicinity of the ring 64, to direct the cold water to flow over the temperature sensitive element casing 62.

The temperature sensitive element 61 is herein shown as having a valve member 69 secured to the cylinder 63 thereof, as by a press fit. The valve member 69 has an annular valve 70 facing the cold water end of the valve body 10 and engageable with a shouldered portion 71 of the valve seating member 44, to control the passage of cold water into the mixing chamber 11 in accordance with the temperature of the mixed water and the hot water entering said mixing chamber and forming a temperature dependent flow control valve for the cold water.

The flow control member 19 is provided in the inlet 12, to control the rate of flow of the hot water into the valve body 10 for mixture with the cold water the rate of flow of which is controlled by the temperature dependent cold water flow control valve element 69 in accordance with the required need for the cold water to temper the hot water to the desired temperature. The flow control member 19 is herein shown as being a flexible annulus contained within the cage 18 and deformable in the direction of the flow of the hot water into the passageway 21. The cage 18 has a central discharge opening 73 conforming generally to form of the frusto-conical wall 20, within which the annulus 19 may flex and restrict the orifice therethrough, upon increases in pressure of the hot water entering the valve body 10 above certain normal pressure values, for which said annulus may be set. The cage 18 is shown as having an annular ring 74 secured to the outer rim thereof to retain the flexible annulus 19 within the hot water inlet 12. Said annulus operates to maintain a constant flow rate of hot water through the passageway 21 on principles similar to those shown and described in Patent No. 2,389,134, which issued to Clyde A. Brown on November 20, 1945, so not herein shown or described further.

It may be seen from the foregoing that a novel and improved form of a mixing valve of a simplified construction has been provided wherein the flow of hot water through the associated shut-off valve into the mixing chamber is controlled by a uniform flow control means and the flow of cold water after it leaves its shut-off valve into the mixing chamber is controlled by a thermostatically operated temperature dependent flow control valve, the operating member of which is within the mixing chamber of the valve and supplies the required volume of cold water to mix with the constant delivered volume of the hot water, to maintain the temperature of the mixed water at the outlet of the valve substantially uniform regardless of variations in flow rates and changes in temperature of the hot and cold water.

It may further be seen that this is attained by providing a flow control in the hot water inlet and a floating thermostat in the mixing chamber for controlling the passage of cold water thereinto.

It may still further be seen that this arrangement of flow control for the hot water and thermostatic control for the cold water, greatly simplifies the construction of the mixing valve over former mixing valves, and provides a simple form of valve which may readily be assembled or taken apart, with fewer parts than former thermostatic valves, and may still accurately maintain the uniformity of temperature of the mixed water to that required for washing or other purposes.

It will be understood that modifications and variations may be effected without departing from the scope of the novel concepts of the present invention.

We claim as our invention:

1. A mixing valve comprising a valve body having hot and cold water inlets, a central mixing chamber, an outlet from said mixing chamber, individual shut-off valves at opposite ends of said mixing chamber for controlling the flow of hot and cold water into said mixing chamber, a flow control member associated with said hot water inlet and means controlling the flow of cold water into said chamber in addition to the associated shut-off valve including a thermostatic element mounted within said mixing chamber and valve means operated thereby for controlling the passage of cold water into said mixing chamber from said shut off valve in accordance with the temperature of the mixed water.

2. In a mixing valve for hot and cold water, a hollow valve body having a central mixing chamber therein and hot and cold water passageways leading into said mixing chamber from opposite ends thereof, means controlling the flow of hot water into said mixing chamber including a deformable annulus in said hot water passageway providing a constant rate of flow of hot water into said mixing chamber regardless of variations in pressure in the hot water at the source, and means controlling the flow of cold water into said mixing chamber including a thermostatic element within said mixing chamber including a casing at the hot water end of said mixing chamber, a cylinder extending therefrom toward the cold water end of said mixing chamber, a piston extensible from said cylinder, and a valve element operable to admit cold water into said mixing chamber upon extension of said piston from said cylinder.

3. In a mixing valve for hot and cold water, a hollow valve body having a central mixing chamber and hot and cold water passageways leading into said mixing chamber from opposite ends thereof, means controlling the flow of hot water into said mixing chamber and providing a substantially uniform rate of flow thereinto comprising a deformable flow control annulus in said hot water passageway, and means controlling the flow of cold water into said mixing chamber comprising a thermostatic element within said mixing chamber including a casing adjacent the hot water side of said mixing chamber, a cylinder extending in the direction of the cold water side of said mixing chamber, a piston extensible from said cylinder, a valve member on said cylinder cooperating with said cold water passageway, a fixed abutment engaged by said piston, and a spring floatingly mounting said thermostatic element within said casing and yieldably urging said piston in engagement with said abutment.

4. In a mixing valve for hot and cold water, a hollow valve body having a central mixing chamber communicating therewith, hot and cold water inlets leading into said valve body at opposite ends thereof and opening to the ends of said valve body, fluid passageways cooperating with opposite ends of said mixing chamber, individual fluid pressure operated shut-off valves closing the opposite ends of said valve body and cooperating with said passageway and controlling the flow of hot and cold water into said mixing chamber from said inlets, a thermostatic element mounted within said mixing chamber including a casing, a cylinder extending therefrom in the direction of the cold water end of said mixing chamber, a piston extensible from said cylinder, valve means on said cylinder and cooperating with said passageway at the cold water end of said mixing chamber and opened upon extension of said piston from said cylinder, to control the passage of cold water into said mixing chamber, and a constant volume flow control member affording a constant rate of flow of hot water into said mixing chamber.

5. A mixing valve for hot and cold water comprising a hollow valve body open at its ends and having a central mixing chamber, annular passageway defining members spaced inwardly from the wall of said valve body leading to opposite ends of said mixing chamber, hot and cold water inlets adjacent opposite ends of said valve body leading into the annular passageways on the outsides of the walls of said passageway defining members to the open ends of said valve body, shut-off valve members closing the opposite ends of said valve body, a thermal-responsive element contained within said mixing chamber and floatingly mounted therein and including a casing adjacent the hot water end of said mixing chamber, a cylinder extending in the direction of the cold water end of said mixing chamber, an abutment seated in the passageway defining member adjacent the cold water end of said mixing chamber, a piston extending from said cylinder and engageable with said abutment, a spring floatingly mounting said thermal responsive element within said mixing chamber and holding said piston in engagement with said abutment, a cold water control valve on said cylinder controlling the flow of cold water into said mixing chamber, the outer end of each of said passageway defining members forming a valve seat for an associated shut off valve, and said passageway defining member at the cold water end of said valve body being removable and forming a valve seat at its inner end for said thermostatically operated valve element.

DAN W. KELLER.
VICTOR E. RIMSHA.

References Cited in the file of this patent

UNITED STATES PATENTS

| Number | Name | Date |
|---|---|---|
| 1,000,435 | Pagelsen | Aug. 15, 1911 |
| 1,153,547 | Finney | Sept. 14, 1915 |
| 1,434,542 | Horne | Nov. 7, 1922 |
| 2,353,577 | Magrum | July 11, 1944 |
| 2,500,750 | Halenza | Mar. 14, 1950 |
| 2,575,043 | Branson | Nov. 13, 1951 |

FOREIGN PATENTS

| Number | Country | Date |
|---|---|---|
| 26,086 | Great Britain | 1913 |
| 547,350 | Great Britain | Aug. 24, 1942 |